United States Patent

Fidelak et al.

[11] Patent Number: 5,182,947
[45] Date of Patent: Feb. 2, 1993

[54] ELECTRIC MEASURING ARRANGEMENT FOR DETERMINING THE LEVEL OF AN ELECTRICALLY CONDUCTIVE LIQUID

[75] Inventors: Michael Fidelak, Bönen; Marlies Bartsch, Iserlohn, both of Fed. Rep. of Germany

[73] Assignee: HL Planartechnik GmbH, Dortmund, Fed. Rep. of Germany

[21] Appl. No.: 664,982

[22] Filed: Mar. 6, 1991

[30] Foreign Application Priority Data

| Mar. 7, 1990 [DE] | Fed. Rep. of Germany | 4007232 |
| Sep. 10, 1990 [DE] | Fed. Rep. of Germany | 4028730 |
| Oct. 8, 1990 [DE] | Fed. Rep. of Germany | 4031845 |
| Nov. 14, 1990 [DE] | Fed. Rep. of Germany | 4036262 |

[51] Int. Cl.$^5$ ............................................. G01F 23/26
[52] U.S. Cl. ..................................... 73/304 C; 73/291; 324/687
[58] Field of Search ............... 73/304 C, 291, 304 R; 33/366; 324/661, 664, 687, 689; 361/284

[56] References Cited

U.S. PATENT DOCUMENTS

| 3,515,987 | 6/1970 | Zurbrick et al. | 324/687 |
| 3,671,857 | 6/1972 | Bergmanis et al. | 324/687 X |
| 3,781,672 | 12/1973 | Maltby et al. | 73/304 C X |
| 3,986,110 | 10/1976 | Overall et al. | 73/304 C |
| 4,135,151 | 1/1979 | Rogers et al. | 324/687 X |
| 4,568,874 | 2/1986 | Kramer et al. | 73/304 C X |
| 4,779,353 | 10/1988 | Lopes et al. | |
| 4,845,421 | 7/1989 | Howarth et al. | 324/689 X |
| 4,851,831 | 7/1989 | Stern | 73/304 C |
| 4,890,491 | 1/1990 | Velter et al. | 73/291 X |
| 4,935,727 | 6/1990 | Re Fiorentin et al. | 73/304 R X |
| 4,966,158 | 10/1990 | Honma et al. | 324/664 X |
| 4,994,750 | 2/1991 | Vrona et al. | 324/664 X |

FOREIGN PATENT DOCUMENTS

| 0123460 | 10/1984 | European Pat. Off. |
| 0136083 | 4/1985 | European Pat. Off. |
| 0161873 | 11/1985 | European Pat. Off. |
| 0170314 | 11/1985 | European Pat. Off. |
| 0358788 | 3/1990 | European Pat. Off. |
| 1250146 | 9/1967 | Fed. Rep. of Germany |
| 1296811 | 6/1969 | Fed. Rep. of Germany |
| 1780523 | 8/1971 | Fed. Rep. of Germany |
| 2151078 | 4/1973 | Fed. Rep. of Germany |
| 2456384 | 7/1975 | Fed. Rep. of Germany |
| 3308361 | 9/1984 | Fed. Rep. of Germany |
| 3411252 | 10/1985 | Fed. Rep. of Germany |
| 3512983 | 11/1985 | Fed. Rep. of Germany |
| 3617234 | 11/1987 | Fed. Rep. of Germany |
| 3838660 | 4/1989 | Fed. Rep. of Germany |
| 3920246 | 1/1991 | Fed. Rep. of Germany |
| 2-150726 | 6/1990 | Japan |
| 459680 | 3/1975 | U.S.S.R. |
| 976300 | 11/1982 | U.S.S.R. |
| 993715 | 6/1965 | United Kingdom |

Primary Examiner—William A. Cuchlinski, Jr.
Assistant Examiner—G. Bradley Bennett
Attorney, Agent, or Firm—Sixbey, Friedman, Leedom & Ferguson

[57] ABSTRACT

An electric measuring arrangement having at least one measuring sensor and an evaluation circuit which makes possible a continuous measurement of not only the level of a conductive liquid in a container but, also, enables evaluation of as much other physical data relating to the liquid as possible, such as its inclination, the position of a movable body in the liquid, linear or rotational acceleration, and speed. Each measuring sensor is designed as a stray field sensor with two measuring electrodes that are at a specific lateral distance from one another, and the container, together with the liquid placed in it, form a part of the measuring arrangement.

30 Claims, 8 Drawing Sheets

ELECTRIC MEASURING ARRANGEMENT FOR DETERMINING THE LEVEL OF AN ELECTRICALLY CONDUCTIVE LIQUID

BACKGROUND OF THE INVENTION

The invention relates to an electric measuring arrangement having at least one measuring sensor and an evaluation circuit for determining the level of an electrically conductive liquid, such as water, in a container as well as other physical properties thereof.

The known electric measuring arrangement, from which the invention starts, serves only for measurement of the level of a liquid in a container. For this purpose, on the wall of the container a measuring head is placed, whose position corresponds to a specific level of the liquid in the container. If the liquid reaches this measuring head, an output signal is given by the measuring sensor, which is evaluated by the evaluation circuit as "reaching of the level." The measuring sensor is designed as a capacitively operating, contactless actuatable proximity switch. However, it can also be a measuring sensor, which works with two measuring electrodes, which are then bridged by the electrically conductive liquid.

The known electric measuring arrangement, explained above, from experience, has proved itself in principle but suffers from the disadvantage that only a discrete measurement is possible. Moreover, it would be advantageous to be able to observe more extensive measurements.

Additionally, stray field sensors for the measurement of the electrolytic conductivity of a liquid have long been known, by themselves (cf. "messen + prüfen-/automatik", Oct. 1976, 554, 563). Therefore, reference is made to the above-mentioned technical literature for the theory and measuring technology of stray field sensors. It is essential that a measuring sensor designed as a stray field sensor definitely be able to have four or six measuring electrodes, keeping in mind that, for reasons of measuring technique, it is suitable to separate the current electrodes from the voltage electrodes for the potential measurement. As a result the polarization effects on the electrodes through which the current flows are outside the actual measuring range of the voltage electrodes.

SUMMARY OF THE INVENTION

The primary object of the present invention, therefore, is to provide an electric measuring arrangement for corresponding measuring tasks, which makes possible a continuous measurement of not only the level of a conductive liquid in a container but, also, as much physical data relating to the liquid as possible, such as its inclination, the position of a movable body in the liquid, linear or rotational acceleration, and speed.

The object, indicated above, is achieved in an electric measuring arrangement having at least one measuring sensor and an evaluation circuit by each measuring sensor being designed as a stray field sensor with two measuring electrodes that are at a specific lateral distance from one another and by having the container, together with the liquid placed in it, form a part of the measuring arrangement.

According to the invention a stray field sensor is used in an untypical manner, namely, in the final analysis, for volume measurement by the measuring electrodes. In this case, the stray field is formed by the measuring electrodes to be ball-shaped or bell-shaped in the liquid. The measured electrical conductivity is directly dependent on the volume of the liquid over the stray field sensor. At a constant specific conductivity of the liquid, a specific measured conductivity can easily be converted into a specific level of the liquid in the container if the geometry of the container and the other parameters of the measuring arrangement are known. If the conductivity of the liquid is not known or fluctuates, for adjustment, a separate stray field sensor can be used as a "standard" or "control" conductivity sensor to make possible a standardization.

It is essential that, according to the invention, also the container and the liquid itself be able to form a part of the measuring arrangement. In this preferred teaching, the liquid in the electric measuring arrangement is only just a means to the end, i.e., its level is only just an indication for use in quantifying other mechanical or physical conditions which bring about the specific level of the liquid.

Preferably, the measuring electrodes, basically, lie in a plane. Different levels of the measuring electrodes make evaluation more difficult; but, at times and for other reasons, they can prove to be advisable.

Basically, it would also be possible to place two or more measuring sensors, each of which has two or three measuring electrodes, in a container. Then, it would be possible to switch from one measuring sensor to another measuring sensor e.g., at inclinations extending over 45°. With a container, equipped with measuring sensors on all walls, the rotation of the container in any direction could be measured by switching from one measuring sensor to another measuring sensor.

Further objects, features and advantages of the present invention are explained, below, in greater detail relative to several embodiments of the invention in conjunction with the FIGURES of the drawings.

DETAILED DESCRIPTION OF THE PREFERRED EMBODIMENTS

Figures 1, 2A:
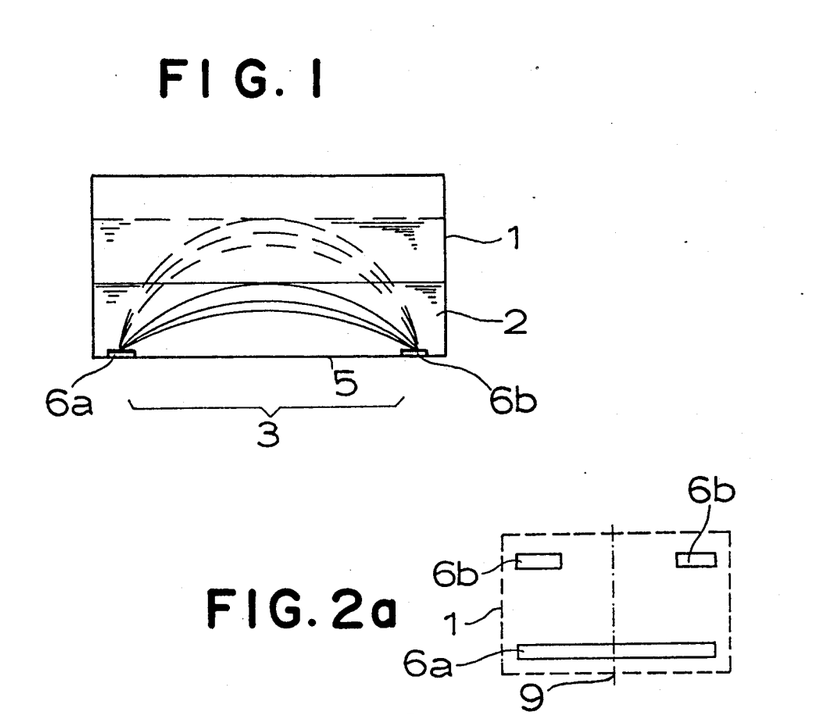
FIG. 1 is a diagrammatic representation of a container with a liquid in it, and a corresponding measuring arrangement.
FIG. 2a is a diagrammatic representation in top view of a specific arrangement of the measuring electrodes.

FIG. 1 shows, first, the basic design of an electric measuring arrangement according to the invention for measurement or calculation of the level of an electrically conductive liquid 2 placed in container 1, or other physical data relating to it. The liquid 2 can be normally conductive water or any other electrically conductive liquid.

The electric measuring arrangement shown in FIG. 1 comprises a measuring sensor 3. An evaluation circuit 4 is connected to such a measuring sensor 3, as is represented in the basic block diagram, for example, in FIG. 7, for another embodiment. All this is known from the prior art.

Figure 1A:
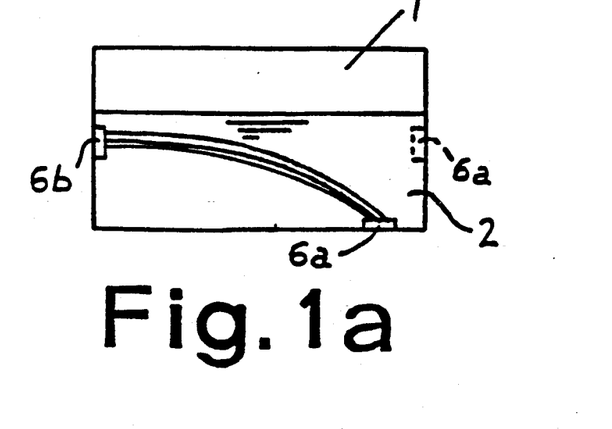
FIG. 1a shows a modification of the FIG. 1 arrangement.

It is now essential, first, that measuring sensor 3, constructed as a stray field sensor be designed with two measuring electrodes 6a, 6b that are located at a specific lateral distance from one another, this distance being explained more fully below. In the preferred embodiment, represented here, in which the measurement of the level of the liquid in container 1 is involved, the two measuring electrodes 6a, 6b are placed in a common plane, namely on bottom 5 of container 1. Thus, the electrodes 6a, 6b are essentially at the same level, which simplifies the measuring evaluation. The stray field formed by the electrodes in liquid 2 is indicated. As a result, the value measured with measuring sensor 3 changes significantly with the height or level of liquid 2 (as can be seen by comparing the solid and broken line representations in FIG. 1). From the level, it is then possible to calculate other mechanical data involving liquid 2, for example, its volume. It is easy to see from FIG. 1 that measuring electrodes 6a, 6b can lie in different planes, especially at an angle to one another, for example, one measuring electrode 6a on bottom 5 of container 1 and the other measuring electrode 6b on the side wall of container 1 as shown in the FIG. 1a modification. Such an arrangement can be suitable under certain measuring conditions, such as where acceleration in one direction will affect the stray field in a different manner than acceleration in the other direction. Basically the two measuring electrodes 6a, 6b could also be placed on opposite walls of container 1, as reflected by the broken line representation of electrode 6a in FIG. 1a.

To make possible as correct a determination as possible of the level of liquid 2 in container 1, in the embodiment according to FIG. 1, measuring electrodes 6 of measuring sensor 3 are placed close to the outermost edges of bottom 5. Moreover, the representation of two measuring electrodes 6a, 6b is only a basic representation, it is indeed known in the art for stray field sensors, for measuring reasons, to separate the power supply by the electrodes from the voltage measurement, i.e., to work with current electrodes and voltage electrodes. Although, in the represented embodiment, the assumption was that the operation is performed with only two measuring electrodes per measuring sensor 3, the other alternatives are, of course, equally feasible.

Stray field sensors of the type being discussed can, in an especially suitable way, be designed in planar technique on a substrate. For this purpose, the electrically conductive flat structures can be provided as a coating or film on a substrate, especially by a thin-film technique, and preferably by the planar process (which is known for use in producing transistors). Then, a dielectric resistant to the respective liquid 2 is applied at specific points as covering in planar technique or other coating technique.

Figure 2:
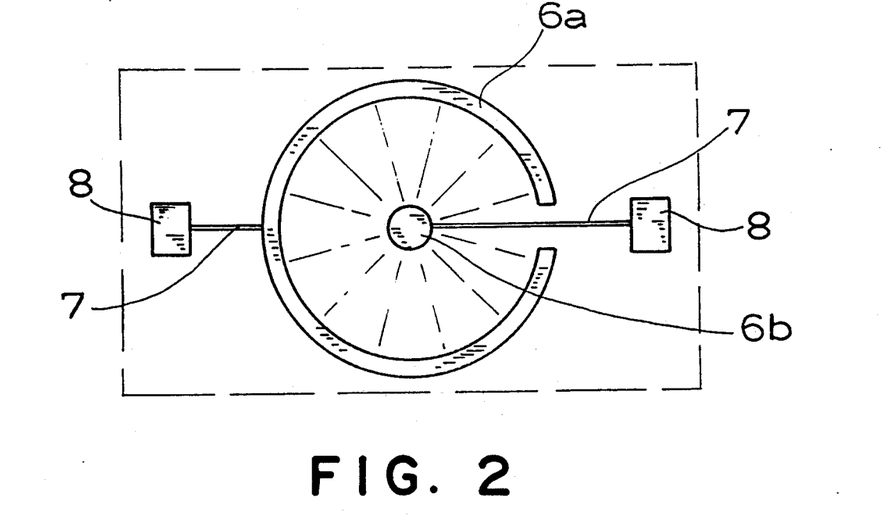
FIG. 2 is an especially preferred embodiment of a measuring sensor according to the invention.

FIG. 2 shows a very specially preferred configuration of a measuring sensor 3 for an electric arrangement according to the invention; namely, one in which the measuring electrode 6a forms an essentially annular electrode surface and the other measuring electrode 6b forms a circular electrode surface lying in the center of the ring-shape of annular electrode 6a with the edges of the two electrode surfaces being also spaced apart by a specific distance from one another. It is seen here that leads 7 from connection surface 8 to the substrate, are made as narrow as possible to keep the occurring stray fields as small as possible. In the represented arrangement of measuring electrodes 6 of measuring sensor 3 it is guaranteed that altogether, the measured stray field is kept constant independent of the inclination of container 1 toward any of the possible directions. This cannot be so guaranteed with measuring electrodes 6 aligned on a specific axis.

So far an electric measuring arrangement has been explained basically, as being a measuring sensor 3, which forms a stray field on measuring electrodes 6 with only general mention of the significance of the distance between the measuring electrodes. Thus, it is now mentioned that the maximum measurable level is about 3.0 times the spacing of measuring electrodes 6, if sufficient measuring accuracy is assumed and if the widely spaced measuring electrodes 6 represented in FIG. 1 are used. In the embodiment represented in FIG.

2, the measurable maximum level is reduced to about 2.5 times the diameter of measuring electrode 6a; although, there is, then, the advantage that the measurement is independent of the inclination of the liquid in the container. Thus, the specific spacing between the electrodes, or this spacing and the diameter of circular electrodes, must be set in consideration of these relationships and the maximum level or height of the liquid above the electrodes which will be involved in the uses to which the arrangement will be put.

It is essential that an electric measuring arrangement of the type explained above also be able to be used as a measuring arrangement for other mechanical data. According to the invention, it has been recognized that the container, together with the liquid placed in it, can form a part of the measuring arrangement, so that other mechanical data, for example, the inclination of the container with the liquid placed in it, rotation of the container, linear acceleration of the container and/or other physical data can be measured, in each case, by the behavior of the liquid in the container being measured.

Figure 3:
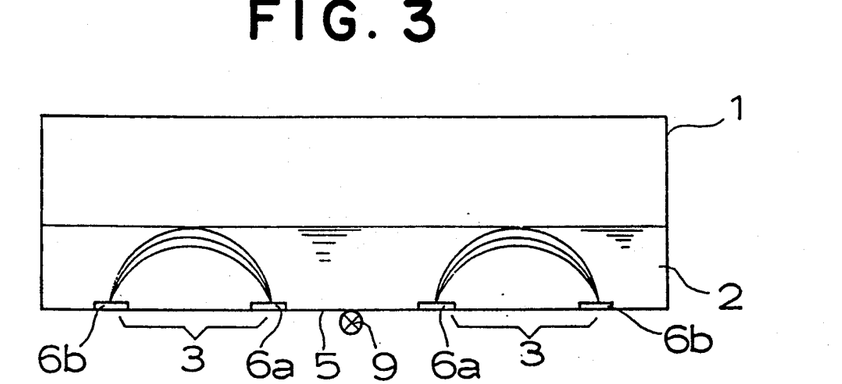
FIG. 3, relative to the type of representation, is a representation corresponding to FIG. 1, of a measuring arrangement according to the invention that has been modified for an inclination measurement.

Special measuring effects can be achieved on the basis of the level measurement with the use of several measuring sensors 3, especially on the bottom 5 of container 1. In addition, FIG. 3 shows that container 1 can be tilted around a tilt axis 9, placed here virtually in the center of bottom 5, and that a respective measuring sensor 3 is placed on each side of tilt axis 9. The measured values of the two measuring sensors 3 can be determined by evaluation circuit 4; namely, can be calculated, especially, in a differential evaluation process. In the embodiment represented here, the measuring sensors 3 are placed on both sides of tilt axis 9, basically symmetrical to it.

Figure 4:
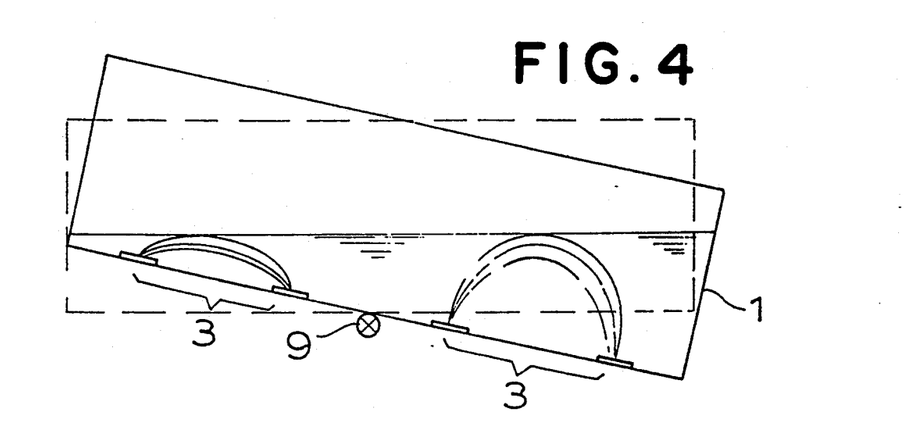
FIG. 4 is the measuring arrangement of FIG. 3 with an inclined container.

Tilt axis 9 does not have to be a physically present pivot since, in any case, it is always a virtually present system-inherent effect, even if container 1 in FIG. 4, for example, is moved parallel to itself. It is essential that, basically, one sensor 3 be placed on each side of the "center." It can be seen from FIG. 3 that with planar alignment of container 1 and the liquid level in the container 1 in the area of the two measuring sensors 3, the surface of the liquid is also at the same distance from bottom 5, so that in the framework of the measuring and evaluation accuracy the measured stray fields are identical. In contrast to this, in FIG. 4 it can be seen that the stray field of measuring sensor 3 on the right has been considerably enlarged because of the inclination of container 1, while the stray field of measuring sensor 3 represented on the left has been constricted by the inclination of container 1. An evaluation with evaluation circuit 4 thus, for example, makes an inclination measurement for container 1 possible. This can be used to great advantage in position determination systems, in "electronic spirit (bubble) levels," etc., especially if it is considered that measuring sensors 3 can be designed by a planar process, i.e., if necessary they can be miniaturized. In this regard, it is noted that, given the fact that the distance between sensors 3 is known, the angle of inclination is readily obtainable trigonometrically from the difference in the height of the liquid determined from each sensor.

Figure 5:
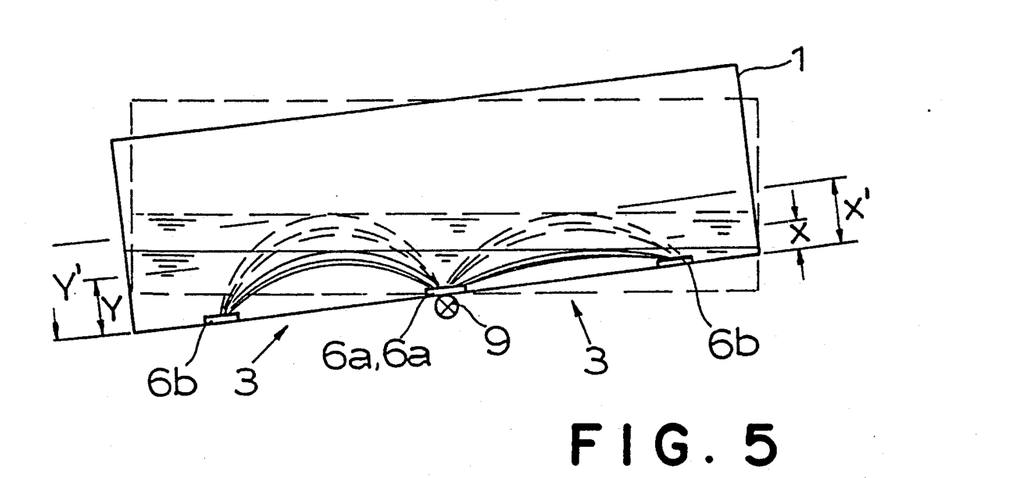
FIG. 5 shows the measuring arrangement from FIG. 3 with the container inclined in the other direction, and with a somewhat different arrangement of the measuring electrodes and a representation of the effect on the measurement accuracy of levels at different heights of the liquid.

FIG. 5 makes clear that, with the inclination measurement explained by FIG. 3 and 4, with respect to the evaluation it is more favorable if the standard height of the level of liquid 2 in container 1 is as low as possible. It can be seen that the relative change x/y in FIG. 5 is considerably greater than the relative change x'/y'.

Thus, the farther outward the measuring electrodes 6b are removed from the more central measuring electrodes 6a and the lower the filling height is, the greater is the measuring sensitivity; although, the available angle measuring area is, of course, correspondingly smaller.

To avoid stray fields between different measuring sensors 3, which occur and distort the measurement, it is recommended that measuring electrodes 6a, i.e., those nearer tilt axis 9, be at the same potential. The next step, in this regard, is the configuration according to FIG. 5, which is characterized in that measuring electrodes 6a, near tilt axis 9, of the two measuring sensors 3 be combined into a single electrode surface. This, of course, is a considerable simplification of the circuit design, and attention has to be paid only that the electrode surface of the electrode forming the two measuring electrodes 6a be centered on tilt axis 9, even though it is only virtually present. But, it is also possible to work with measuring electrodes arranged crosswise, and then one measuring electrode 6a runs crosswise over tilt axis 9, as diagrammatically represented in FIG. 2a.

Figure 6:
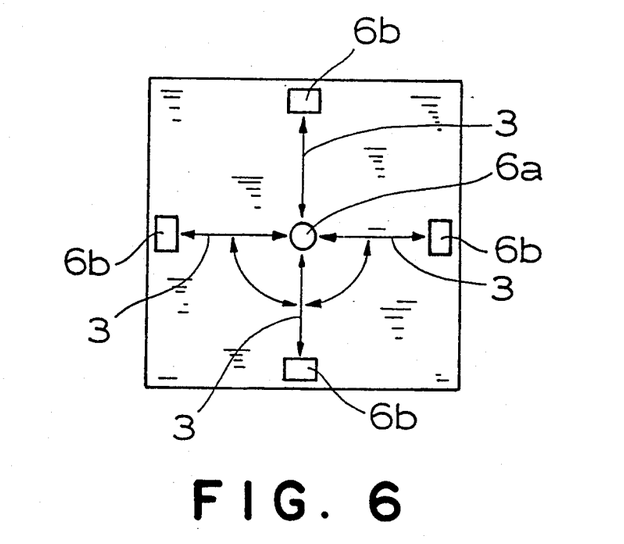
FIG. 6 is a top view of a substrate of a measuring arrangement with four measuring sensors designed in a planar arrangement.

In themselves, the measuring arrangements according to FIGS. 3 to 5 are sensitive only in regard to an inclination or tilting around tilt axis 9, they are not inclination sensitive or only very slightly inclination sensitive to a tilt axis running perpendicular to it. If it is desired to be able to measure inclinations of tilt axes running perpendicular to one another, i.e., in the final analysis to measure inclinations in all directions, it is recommended that, in addition to the first pair of measuring sensors 3, a second pair of measuring sensors 3 be provided and be centered on the same center point as the first pair of measuring sensors 3, angularly offset, preferably by 90°, relative to the first pair of measuring sensors 3. FIG. 6 shows such a measuring arrangement with two pairs of measuring sensors 3, and in addition, the more centrally located measuring electrodes 6a of all of the measuring sensors 3 are combined into a single electrode surface. In the represented embodiment, the angles indicated by the curved arrows each are 90°, with appropriately modified evaluation programs it is possible, of course, to operate with two pairs of measuring sensors 3 that are not exactly at 90° angles.

Figure 7:
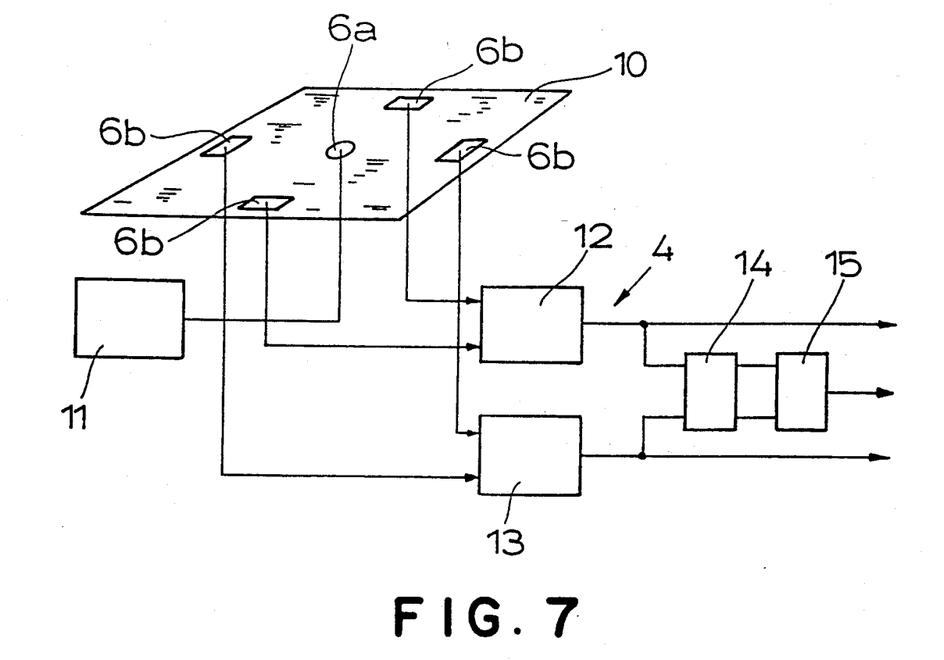
FIG. 7 shows a diagrammatic representation of the measuring arrangement from FIG. 6 with the related evaluation circuit.

FIG. 7 shows the measuring arrangement from FIG. 6 with a diagrammatically indicated substrate 10 upon which are applied measuring electrodes 6a, 6b, which were produced via a planar process. For evaluating the signals from the electrodes, a generator 11, a first subtraction circuit 12 for the first pair of measuring sensors 3, a second subtraction circuit 13 for the second pair of measuring sensors 3, a zero position locking step 14 and an AND circuit 15 are provided. On the outputs represented by the arrows, the inclination measuring signals for the x direction are up, for the y direction they are down. A signal is emitted on the center output only when container 1 is exactly in horizontal alignment, i.e., an inclination in no direction is given. This is a possibility of performing the appropriate evaluation with evaluation circuit 4.

For measuring uses it is further advisable that an acoustic signal be able to be triggered by evaluation circuit 4, especially, that different evaluation signals be able to be triggered depending on the polarity of the output signal for indicating the tilting direction. Thus, for example, it is especially possible to work "blind" with an electronic spirit level, which is a great advantage for many uses. Moreover, of course, corresponding optical signals would also be appropriate if this seems suitable in the respective case of use.

Figure 8:
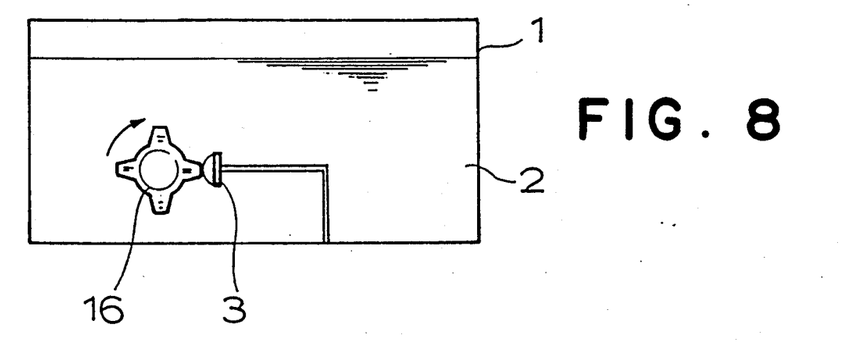
FIG. 8 is a diagrammatic representation of an electric measuring arrangement for determination of the position of a movable body in an electrically conductive liquid.

FIG. 8 now shows another similar area of use for an electronic measuring arrangement of the type being discussed. Here, the position of a movable body 16 that is disposed in electrically conductive liquid 2 can be examined with an appropriate measuring sensor 3. Now, the measuring sensor(s) 3 is designed as a stray field sensor with two measuring electrodes 6a, 6b basically located in a common plane at a specific lateral distance from one another, and the measuring sensor 3 is placed near the path of movement of movable body 16 with the electrode surfaces of measuring electrodes aligned relative to movable body 16. Here also, the measuring sensor 3 is designed as a stray field sensor and can, of course, be suitably produced by a planar process.

Figure 9:
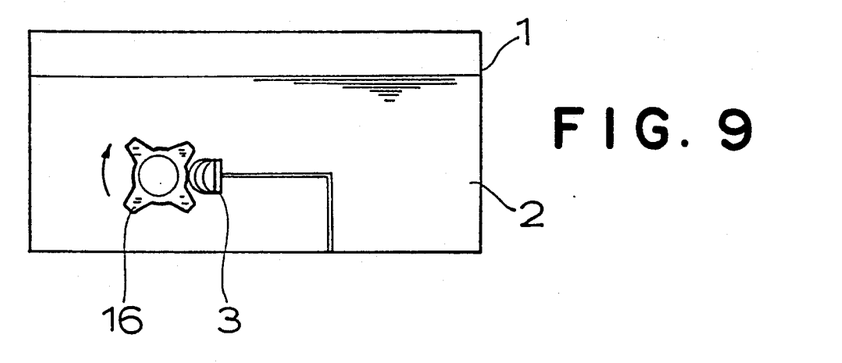
FIG. 9 is a representation corresponding to FIG. 8 of the measuring arrangement with the movable body in another position.

In the embodiment according to FIGS. 8 and 9, for example, a rotating part is in liquid 2, whose speed is to be measured. This takes place with measuring sensor 3—represented there—designed as a stray field sensor whose stray field formation is reduced in each case by the teeth of body 16 traveling past and in front of measuring electrodes 6. FIG. 8 shows this very clearly in comparison with FIG. 9.

Figure 10:
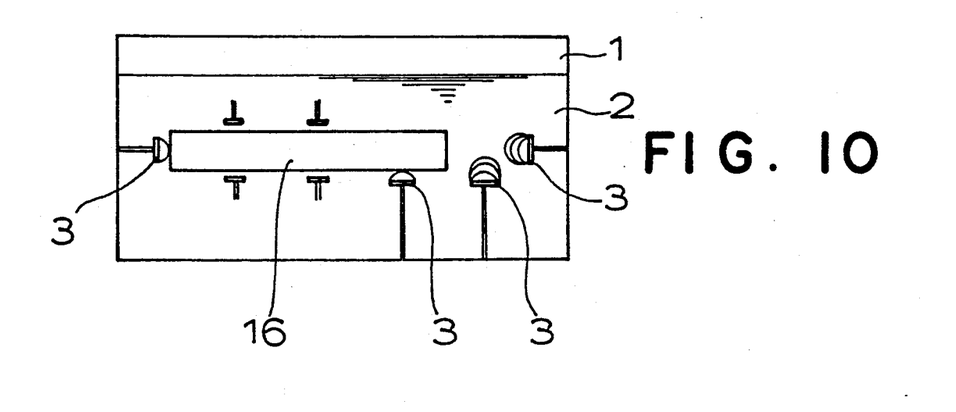
FIG. 10 shows another embodiment of a corresponding electric measuring arrangement.

FIG. 10 shows another use of the measuring arrangement discussed above, which is characterized in that several measuring sensors 3 are placed along the path of movement of movable body 16a. In this case, body 16a is an oblong part, which moves relative to several measuring sensors 3. Thus, in this case, a kind of position measurement, or at least a position determination is performed. Accordingly, measuring sensors 3, placed successively in one direction, can, of course, also be used for other use fields, which will be explained in greater detail below.

Generally stray field sensors of the type being discussed, in any case if they are produced by a planar process, can be operated at temperatures of up to about 600 K. Of course, appropriate materials have to be selected for this purpose. Further, as was initially explained, for purposes of calibration or standardization, a stray field sensor used as a pure conductivity sensor can be provided, but which is not represented in detail in the FIGURES.

Usual possibilities for circuit engineering configuration apply to the evaluation circuit. It is especially suitable that the evaluation circuit 4 be designed using such evaluation electronics as a microprocessor, or is integrated in a microprocessor.

Figure 11:
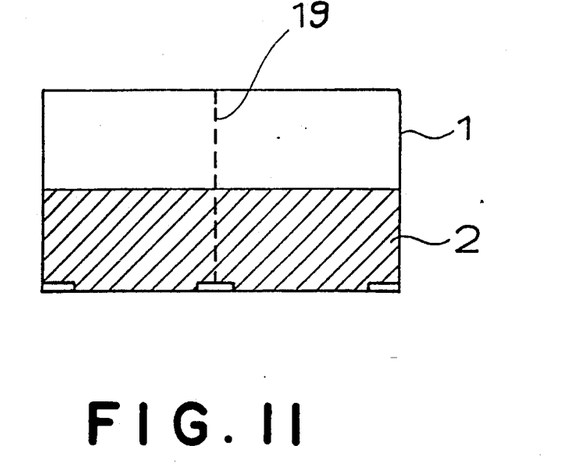
FIG. 11 is a representation, corresponding in principle to FIG. 5, of an embodiment with a separating wall in the container.

FIG. 11 shows now an embodiment of a measuring arrangement according to the invention, further preferred in mechanical respect, which is characterized in that at least one separating element 19 is placed or formed in the container 1, by which a specific increased flow resistance is produced for movement of the liquid from one side of separating element 16a to the other side of separating element 16a, so that a specific damping can be set. The damping constant of container 1, used here as an inclination sensor, can be set by the number and size of the openings in separating element 16a, designed here as a perforated plate. An alternative could also consist in separating element 16a being made as a separating wall with openings or as a double separating wall with an undercurrent duct, thus in a way dividing container 1 into two parts with a flow connection of small cross section.

From the measuring aspect it can be a problem that electrically conductive liquid 2 in container 1 adheres to the wall of container 1 since it can result the level measurement being distorted. This adhesion effect can be eliminated by container 1 being filled with an electrically nonconductive auxiliary liquid 17 (FIG. 12) above electrically conductive liquid 2. Only the area of electrically conductive liquid 2 is effective for measurement. However, the edge of the electrically conductive liquid 2 is corrected or freed from adhesion forces by the electrically nonconductive auxiliary liquid 17 filled over it. Of course, the term "electrically conductive" in comparison with the term "electrically nonconductive" is relative, i.e., even an only slightly conductive auxiliary liquid 17 can possibly be used for covering electrically conductive liquid 2.

Figure 12:
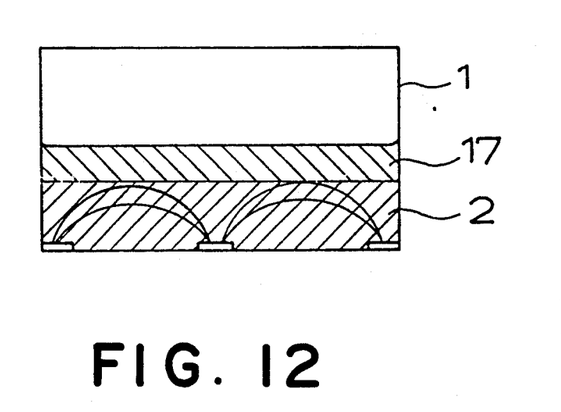
FIG. 12 is a representation, corresponding in principle to FIG. 5, of an embodiment with an auxiliary liquid above the liquid.
Figure 13:
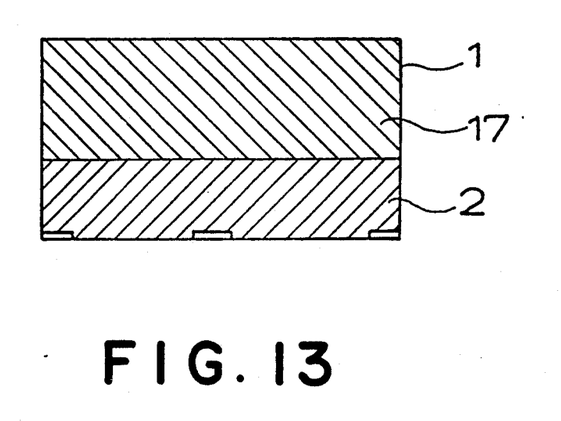
FIG. 13 is a representation, corresponding to FIG. 12, of a container completely filled with liquid and auxiliary liquid

While FIG. 12 shows the above-explained covering of the conductive liquid 2 with an auxiliary liquid 17 and that container 1 is not yet fully filled with liquid. FIG. 13 shows a preferred form, or in any case one which is, at times, preferred, in which container 1 is completely filled with liquid 2 and auxiliary liquid 17. Sometimes this allows interference effects to have less impact. It is also possible to evacuate (practically) the volume of container 1 above liquid 2 or auxiliary liquid 17, so that, above the liquid level, only the saturation vapor pressure of liquid 2 or of auxiliary liquid 17 appears. In this case a correspondingly matching pressure in the remaining volume is to be selected.

It has already been noted above that several measuring sensors 3 can be successively placed in one direction. Such an arrangement would allow a level profile to be obtained in container 1. Correspondingly, it is advisable that evaluation circuit 4 be designed to obtain such a level profile. Even with only two measuring sensors or even one measuring sensor level profiles can be obtained but with less measuring accuracy.

Figure 14:
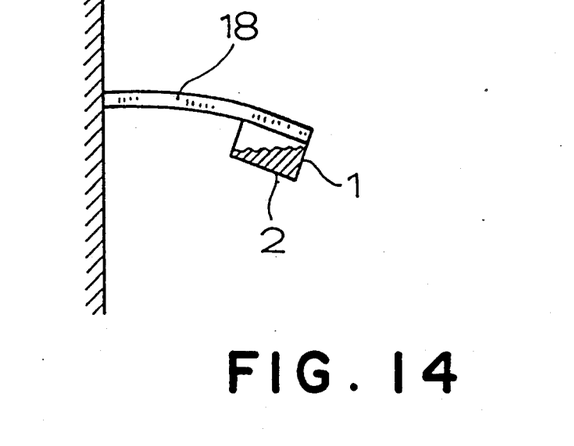
FIG. 14 shows another embodiment of a measuring arrangement according to the invention, here, in connection with a deformation body for inclination measurement.

FIG. 14 now shows a use of the measuring arrangement according to the invention in which container 1 is used in connection with a deformation body 18 that changes its inclination by deformation, especially by the action of weight. Deformation body 18 in the embodiment represented in this case is a bending rod, which, for example, in a balance can serve to receive a weight to be weighed.

If container 1 of the measuring arrangement according to the invention is placed on deformation body 18, the angle of inclination is proportional to the force introduced onto deformation body 18, for example, the force due to weight. The measuring arrangement used in this case according to the invention can have a very great sensitivity (for example, 1 mV/0.001°). Especially important with this electric measuring arrangement is the fact that not only can the inclination of container 1 caused by the action of weight be measured with this electric measuring arrangement, but also it is possible to establish for example by the use of a balance for example, whether a balance without a load is level. With the appropriate configuration of evaluation circuit 4, it would, for example, be possible first to perform a check of the level alignment of the balance before any actual weight measurement and, in case of deviations, to perform an independent calibration.

The measuring arrangement to be used as inclination sensor in connection with a deformation body 18 can also be used for deformation measurements as such, for example, for the measurement of position deviations in workpieces, buildings or bridges. In this respect very broad fields of use exist.

Figure 15:
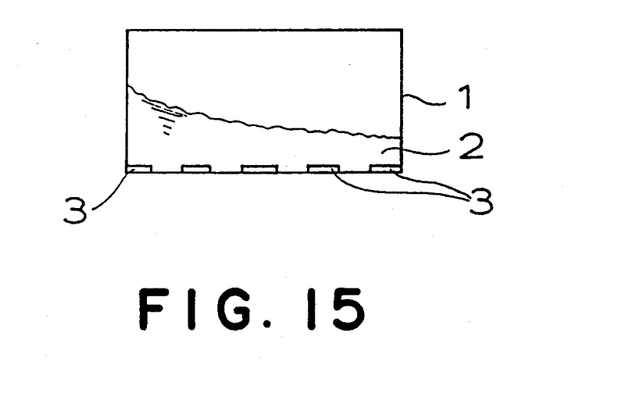
FIG. 15 illustrates an embodiment of a measuring arrangement for linear acceleration measurement.
Figure 16:
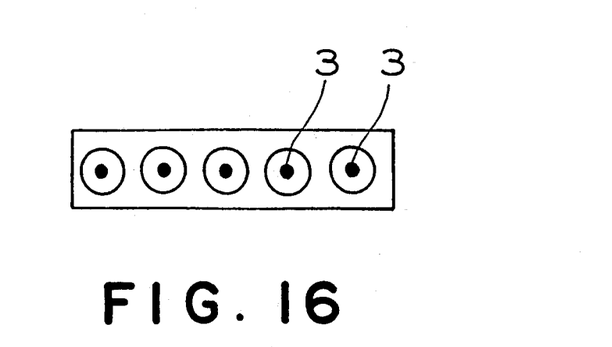
FIG. 16 is a top view of the arrangement of the measuring sensors of the measuring arrangement from FIG. 15.

FIG. 15 makes another example of use clear in which the measuring arrangement according to the invention is used for linear acceleration measurement. In a linear acceleration toward the right in FIG. 15, liquid 2 in container 1 logically accumulates on the left wall of container 1, with the measuring arrangement developed there for the measurement of a level profile a measuring signal corresponding to the acceleration of container 1 can be calculated. FIG. 16 shows the successive arrangement of several measuring sensors 3 in one direction. Further, it goes without saying that even superposed inclinations can be measured with such a system.

Figure 17:
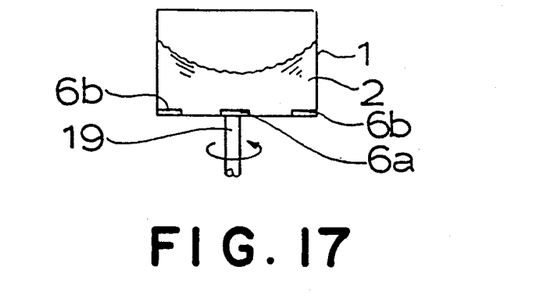
FIG. 17 shows an embodiment of a measuring arrangement according to the invention for rotational acceleration or speed measurement.
Figure 18:
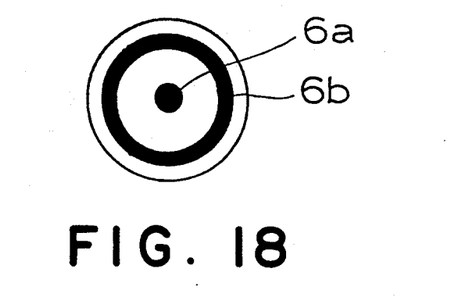
FIG. 18 is a top view of the measuring sensor of the measuring arrangement from FIG. 17.

FIG. 17 shows that container 1, in this case, is designed as a rotating body. The now running rotation of container 1 with shaft 19 is indicated by the circular arrow. Liquid 2 is forced on the outside wall by the rotational acceleration. The measuring sensor 3 used is represented in FIG. 18; it can be seen that, in this case a relatively simple measuring sensor having a circular electrode 6a within an annular electrode 6b produces the desired reliable measuring result. This measuring result can, of course, also be used for speed measurement.

Figure 19:
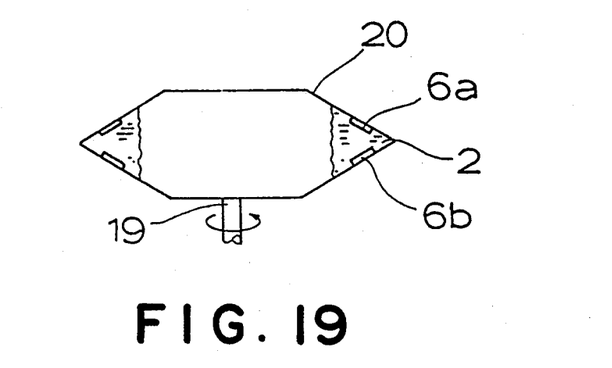
FIG. 19 is a diagrammatic representation of an embodiment of an electric measuring arrangement that is suitable for especially precise speed measurement.
Figure 20:
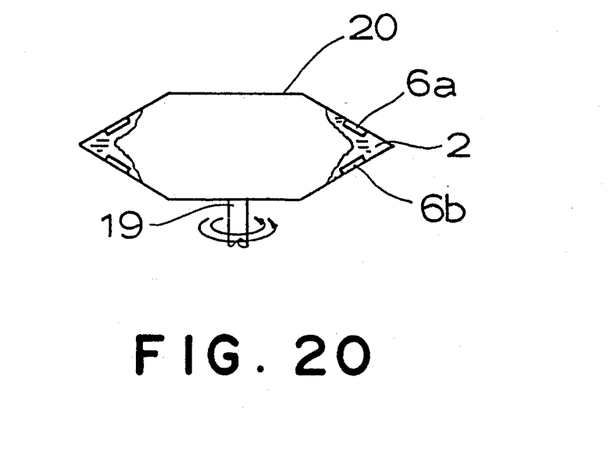
FIG. 20 shows the measuring arrangement of FIG. 19 at high speed.

FIG. 19 and 20 show a particularly configured embodiment of a system that can be used for rotational acceleration measurement or for speed measurement. In this case, a rotating body 20 having a transverse vertical cross section in the shape of a double trapezoid is placed on shaft 19. Circular measuring electrodes 6a, 6b can be seen on the tapering outside walls of the rotational body.

With the low speed of rotational body 20 represented in FIG. 19, liquid 2 is kept in the position represented, possibly supported by appropriate auxiliary devices. If, now, the speed is increased, which is indicated by the circular double arrow in FIG. 20, the position of liquid 2 changes relative to measuring electrodes 6a, 6b in the way indicated. The result of the measurement of the rotational acceleration or the speed with this special rotational body 20 is particularly exact. In this case a position-independent speed sensor for especially high speeds is involved.

Of course, there are still many other use possibilities for the electric measuring arrangement according to the invention, it is essential that the stray field principle always be used, in which the ability of miniaturization by planar technique offers very special advantages.

While we have shown and described various embodiments in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. Electric measuring arrangement for determining liquid level and other physical data relating to an electrically conductive liquid located in a container, comprising at least one measuring sensor and an evaluation circuit; wherein the at least one measuring sensor is a stray field conductivity sensor with two measuring electrodes spaced at a specific lateral distance from one another, said electrodes producing an electromagnetic stray field within the electrically conductive liquid, the electrodes being disposed within the container in direct electrical contact with the electrically conductive liquid in the container wherein the container together with the electrically conductive liquid in it form a part of the measuring arrangement; and wherein the evaluation circuit comprises means for determining physical characteristics pertaining to the electrically conductive liquid from the volume of liquid measured over the measuring sensor, a known value of the conductivity of the electrically conductive liquid and said specific lateral distance.

2. Measuring arrangement according to claim 1, wherein the measuring electrodes are disposed in a common plane.

3. Measuring arrangement according to claim 2, wherein said specific distance has a value that is coordinated to the maximum level of the liquid in the container to be measured in accordance with a ratio of 1:3.

4. Measuring arrangement according to claim 1, wherein the measuring electrodes are in different planes with respect to one another.

5. Measuring arrangement according to claim 4, wherein the measuring electrodes are disposed at an angle relative to each another.

6. Measuring arrangement according to claim 1, wherein at least one of said measuring electrode is disposed on the bottom of the container.

7. Measuring arrangement according to claim 6, wherein the measuring electrodes are located near outermost edges of the bottom of the container.

8. Measuring arrangement according to claim 1, wherein the measuring sensor comprises an electrode formed as a film or coating on a substrate.

9. Measuring arrangement according to claim 8, wherein a first of the measuring electrodes is in the form of an essentially closed annular electrode having a ring-shaped surface and another of the measuring electrodes forms a circular electrode surface lying in the center of the ring-shaped surface of the first electrode; and wherein closest edges of the two electrode surfaces are spaced a radial distance from one another.

10. Measuring arrangement according to claim 9; wherein the diameter of the circular electrode has a value that is coordinated to the maximum level of the liquid in the container to be measured in accordance with a ratio of 1:2.5.

11. Measuring arrangement according to claim 1, wherein a first one of the measuring electrodes is an annular electrode having an essentially ring-shaped surface, and a second of the measuring electrodes has a circular electrode surface that lies in the center of the ring-shaped surface of the first electrode; and wherein nearest edges of the two electrode surfaces are radially spaced at a distance from one another.

12. Measuring arrangement according to claim 1, wherein container tiltable around a tilt axis, wherein at least a first pair of measuring sensors is provided, one measuring sensor being located on each side of the tilt axis; and wherein an evaluation circuit is provided as a means for determining said data from measured values obtained from the two measuring sensors.

13. Measuring arrangement according to claim 12, wherein the measuring sensors are disposed basically symmetrical to tilt axis.

14. Measuring arrangement according to claim 12, wherein measuring electrodes of the measuring sensors that are closest to the tilt axis are at the same potential.

15. Measuring arrangement according to claim 12, wherein the measuring electrodes of the measuring sensors that are closest to the tilt axis are combined into a single electrode surface.

16. Measuring arrangement according to claim 12, wherein, a second pair of measuring sensors is provided and is centered on a common center point with respect to the first pair of measuring sensors and is angularly offset relative to the first pair of measuring electrodes.

17. Measuring arrangement according to claim 16, wherein the second pair of measuring sensors is angularly offset by 90°, relative to the first pair of measuring sensors.

18. Measuring arrangement according to claim 16, wherein one of the measuring electrodes of each sensor is closer to the center of the container than the other; and wherein the electrodes of every measuring sensors that are closer to the center are combined into a single electrode surface.

19. Measuring arrangement according to claim 12, wherein at least one separating element is located in the container as a means for producing a specific increased flow resistance for the liquid from one side of separating element to an opposite side of the separating element, whereby a specific damping can thus be set.

20. Measuring arrangement according to claim 19, wherein said at least one separating element comprises one of a perforated plate, a single separating wall with openings, and a double separating wall with an undercurrent duct.

21. Measuring arrangement according to claim 1, wherein several measuring sensors are placed successively in one direction.

22. Measuring arrangement according to claim 1, wherein a conductivity sensor, in the form of a stray field sensor, is provided for purposes of calibration.

23. Measuring arrangement according to claim 1, wherein said evaluation circuit comprises a microprocessor or is integrated in a microprocessor.

24. Measuring arrangement according to claim 1, wherein an electrically nonconductive auxiliary liquid of lower specific weight than said electrically conductive liquid is provided in the container above the electrically conductive liquid.

25. Measuring arrangement according to claim 24, wherein the container is completely filled with the electrically conductive liquid and the auxiliary liquid.

26. Measuring arrangement according to claim 24, wherein a space exists in the container above the auxiliary liquid and said space is evacuated so that only the saturation vapor pressure of the auxiliary liquid exists in said space.

27. Measuring arrangement according to claim 1, wherein a space exists in the container above the electrically conductive liquid and said space is evacuated so that only the saturation vapor pressure of the conductive liquid exists in said space.

28. Measuring arrangement according to claim 12, wherein the container is mounted upon a deformation body which changes its inclination by deforming in response to variations in weight supported thereby.

29. Measuring arrangement according to claim 12, wherein the container is supported for rotational movement.

30. Electric measuring arrangement for determining physical data of at least one movable body disposed within an electrically conductive liquid in a container comprising a container of electrically conductive liquid, at least one movable body disposed within the liquid so as to move along a path therein at least one measuring sensor and an evaluation circuit; wherein each measuring sensor is a stray field sensor with two measuring electrodes located essentially within a common plane at a specific lateral distance from each other; and wherein the measuring sensor is placed near the path of movement of the movable body with electrode surfaces of measuring electrodes aligned relative to the movable body.

* * * * *